United States Patent [19]

Ehm et al.

[11] Patent Number: 4,574,672
[45] Date of Patent: Mar. 11, 1986

[54] CUTTING APPARATUS

[76] Inventors: Karl H. Ehm, Am Alten Schacht 8, D-4100 Duisburg 17; Roderich R. Orendi, Heltorfer Mark 15, D-4000 Dusseldorf 31, both of Fed. Rep. of Germany

[21] Appl. No.: 671,274

[22] Filed: Nov. 14, 1984

[30] Foreign Application Priority Data

Nov. 14, 1983 [DE] Fed. Rep. of Germany ....... 3341424

[51] Int. Cl.⁴ .............................................. B23D 47/00
[52] U.S. Cl. .................... 83/471.2; 83/216; 83/488; 83/558; 83/563; 83/699
[58] Field of Search ....................... 83/113, 216, 471.2, 83/477.2, 486, 488, 664–666, 676, 699, 556, 558, 563

[56] References Cited

U.S. PATENT DOCUMENTS

| 3,878,744 | 4/1975 | Luxnat | 83/556 |
| 3,919,908 | 11/1975 | Jaegers | 83/471.2 |
| 4,289,054 | 9/1981 | Pieper et al. | 83/556 |
| 4,378,715 | 4/1983 | Kaiser et al. | 83/113 |

*Primary Examiner*—Frank T. Yost
*Assistant Examiner*—Hien H. Phan
*Attorney, Agent, or Firm*—King and Schickli

[57] ABSTRACT

A cutting apparatus such as a metal-cutting circular saw apparatus has an axially displaceable shaft for mounting a saw blade. The shaft is hydrostatically supported both in the radial and in the axial direction. To provide for the axial displaceability of the shaft, the shaft is axially hydrostatically supported at one end by means of an annular piston. The piston bears with a radial end portion thereof against a shoulder in the bearing housing, the shoulder projecting into the cylinder in which the piston is displaceable. The piston is of such a cross-sectional shape and elasticity that in an operative position it is elastically pivoted or tilted, thereby reducing the clearance between the piston and the cylinder, so the piston can carry bearing forces in a radial direction, and also eliminating the need for piston sealing means.

6 Claims, 4 Drawing Figures

CUTTING APPARATUS

BACKGROUND OF THE INVENTION

The invention relates generally to a cutting apparatus such as a circular saw assembly for cutting metal.

In a known form of cutting apparatus, the apparatus comprises a shaft for carrying the cutting tool, the shaft being axially displaceable relative to a support or bearing housing in which it is mounted, for the purposes of providing for a return stroke movement of the cutting tool after the cutting operation, without coming into contact with the material being cut. The apparatus has a hydrostatic shaft bearing arrangement which is operative both in the radial and in the axial direction, with a bearing flange which is non-rotatably connected to the bearing housing and which is provided on its inside and at one of its end faces with bearing pockets or recesses with capillary feed means leading thereto. The apparatus further has an annular piston which is arranged axially displaceably in an annular cylinder between a portion adjoining the other end of the bearing flange, being of smaller outside diameter, and the bearing housing. At its end which is towards a bearing ring which is non-rotatably connected to the shaft, the annular piston has bearing pockets or recesses with capillary feed means leading thereto, and, in the operative position of the cutting apparatus, the piston bears against the bearing ring, due to a hydraulic pressure which is applied to the opposite end thereof.

Cutting apparatuses of the above-indicated kind, which are used primarily in the working flow in production installations such as rolling mill trains, in the form of an integrated piece of equipment therein, are generally provided for the purposes of cutting up long portions of the rolled material, being either individual portions or a plurality of portions which are disposed in side-by-side arrangement in the cutting operation, and/or cutting off or cropping the ends of the blanks or unworked components which cannot be put to use. In that operation, the elongate portions of material are generally carried on conveyor means such as roller beds. The portions of material are positioned by suitable means in such a way that the location at which a cut is to be made is aligned with the cutting tool. The material is then clamped in position, and the actual cutting operation is subsequently carried out. After the cutting operation, particularly when using cutting tools which are tipped with a hard material such as a hard alloy or metal or carbide metal, it is necessary to have a space between the material being cut and the cutting tool, before the cutting tool performs its return stroke movement, in order to ensure that any chips or cutting waste or the like which is caught in the apparatus or on the material being cut does not cause damage to the cutting tool during the idle or return movement thereof, or give rise to undesired grooves or scoring at the locations at which the material has been cut.

If the apparatus is to produce a clean cut, it must provide a bearing support for the tool, which is as smooth as possible, during the cutting operation, and thus must have a stable bearing arrangement. In addition, there is the requirement that, after the cutting operation, the cutting apparatus and the material being cut can be moved away from each other for the return movement or idle movement of the cutting tool, but without releasing the material clamping action at both sides, as is required to give a good quality of cut. For that purpose, after the cutting operation or after the cutting stroke movement of the tool has been concluded, the material-clamping device which is disposed at a remote position from the mounting arrangement supporting the cutting tool may first be moved away from the cutting tool by a given distance, and then the shaft carrying the cutting tool, which is mounted displaceably in the bearing or support housing, may be displaced in the same direction after the cutting operation, approximately by half the above-indicated distance. The return stroke movement of the cutting tool can then take place, without touching the cut surfaces of the material which has been cut.

The shaft carrying the cutting tool, which is thus arranged to be axially displaceable in the apparatus, may be supported by rolling-type bearings, but it is also known to use hydrostatic bearing arrangements, for example of the general kind referred to in the opening part of this specification. In this context, hydrostatically supporting the shaft in a radial direction does not in principle give rise to any difficulties. The shaft is supported hydrostatically in the axial direction by virtue of a bearing flange which is non-rotatably connected to the bearing housing and which is provided on its interior with the hydrostatic bearing pockets or recesses which are provided for producing the radial support action, being provided at one of its ends with bearing pockets or recesses having capillary feed means leading thereto, to provide the axial bearing effect. As, to permit the cutting tool to perform its return movement, the shaft must be arranged to be axially displaceable, it is not possible for the shaft to be axially supported in the other direction by means of corresponding bearing pockets or recesses at the other side of the bearing flange. Instead of that, the bearing effect is produced by means of an annular piston which has bearing pockets or recesses with capillary feed means leading thereto and which is disposed in an annular cylinder. The annular cylinder is disposed between a portion of the bearing flange, which is of smaller outside diameter, and the bearing housing. During the cutting operation, the annular piston is subjected to a pressure in the annular cylinder, more specifically from the side thereof which is in opposite relationship to the face of the annular piston which has the bearing pockets or recesses. For the purposes of producing axial displacement of the shaft of the cutting tool, the pressure in the annular cylinder is reduced and then the shaft is displaced axially by means of a separate arrangement. For a fresh cutting operation, pressure is again applied in the annular cylinder to cause the annular piston to be moved back into the operative position in which the shaft is hydrostatically supported in the axial direction, at two oppositely disposed sides.

Therefore, the function of the annular piston in the above-indicated arrangement is to produce or permit an axial hydrostatic shaft support action in the operative position of the cutting apparatus. For that purpose, the annular piston is fitted in the annular cylinder with a clearance of such a magnitude that it cannot jam therein. The clearance is sealed by suitable sealing rings. A disadvantage in that respect is that the bearing flange which is non-rotatably connected to the bearing housing cannot carry radial bearing forces in the region of the annular cylinder or annular piston. Therefore, the above-mentioned bearing flange which is designed at its inside and at one of its side or end faces to provide a radial and an axial hydrostatic bearing support action respectively, must be so dimensioned that it is capable of carrying all radial bearing forces which occur in that area. That means that the bearing arrangement is of considerable volume, which is a disadvantage in particular in regard to the amount of space that it occupies.

SUMMARY OF THE INVENTION

An object of the present invention is to provide a cutting apparatus which has an improved bearing arrangement for supporting the tool carrying shaft.

A further object of the present invention is to provide a cutting apparatus of an improved design such that the bearing arrangement therein can be of smaller size than is required in previous cutting apparatuses.

A still further object of the present invention is to provide a cutting apparatus in the form of a circular saw for cutting metal, having a hydrostatic shaft bearing arrangement which has an improved support action in a radial direction.

These and other objects are achieved by a cutting apparatus, such as in the form of a circular saw apparatus for cutting metal, comprising a bearing housing and a shaft for carrying the cutting tool, which is axially displaceable therein, for the purposes of producing the return stroke movement of the cutting tool, after the cutting operation, without coming into contact with the material to be cut. The apparatus further has a hydrostatic bearing arrangement for supporting the shaft, being operative both in the radial and in the axial direction, having a bearing flange which is non-rotatably connected to the bearing housing and which is provided at its inward surface and at one of its end surfaces with bearing pockets or recesses with capillary feed means leading thereto, and an annular piston which is arranged axially displaceably in an annular cylinder between a portion of the bearing flange which is of smaller outside diameter, said portion adjoining the other end of the bearing flange, and the bearing housing. At its end face which is towards a bearing ring which in turn is non-rotatably connected to the shaft carrying the tool, the annular piston has bearing pockets or recesses with capillary feed means leading thereto. In the operative position of the cutting apparatus, the annular piston bears against the bearing ring, by hydraulic pressure which is applied to the oppositely disposed end face thereof. The annular piston is guided in the annular cylinder with a small amount of clearance, and, in the operative position of the cutting apparatus, the annular piston bears by means of a radial end region of its end which is towards the bearing ring, against a shoulder provided on the bearing housing and projecting into the annular cylinder. The annular piston is of such a cross-sectional shape and elasticity, that, in the operative position, by virtue of the effect of the applied hydraulic pressure, the annular piston is elastically tilted or pivoted about the shoulder and thereby the clearance between the annular piston and the annular cylinder is reduced in such a way that the annular piston is capable of carrying bearing forces in a radial direction. The end face of the bearing ring, which is towards the end face of the annular piston that has the bearing pockets or recesses with capillary feed means leading thereto, is of a conical or tapered configuration such that, in the operative position of the bearing piston, the associated bearing regions are at a uniform spacing.

Due to the hydraulic pressure produced in the annular cylinder or in the annular passage defining the cylinder, as is required for producing the axial hydrostatic bearing effect in the operative position of the apparatus, the annular piston which is in any case guided in the annular cylinder with a small amount of clearance is elastically pivoted or tilted about the shoulder of the bearing housing. That causes the clearance between the piston in the annular cylinder to be reduced to such a degree that the annular piston produces virtually a rigid connection between the bearing housing and the smaller-diameter portion of the bearing flange, as referred to above. That in turn has the result that the smaller-diameter portion of the bearing flange, which is covered by the annular piston, can carry bearing forces in the radial direction. As therefore the part of the bearing flange which adjoins the annular cylinder is virtually rigidly supported in the radial direction by the annular piston (in the operative position), the bearing flange in the apparatus in accordance with the principles of this invention can be made of substantially smaller dimensions, especially as there is no need to provide additional space for fitting piston sealing means as the annular gap between the piston and the cylinder is closed off and sealed in respect of flow of oil therethrough by virtue of the piston tilting as described above. The precise interpretation to be put on the references herein to a small clearance depends on the respective dimensions and material involved. To give an idea of the order of magnitude concerned, the clearance is for example of the order of magnitude of from 0.04 to 0.07 mm when the diameter of the annular piston is of the order of 500 mm, when there is contact at one side against the side opposite to the adjoining side.

Although the cross-sectional shape of the annular piston in the apparatus in accordance with the teachings of this invention may vary considerably, it has been found that a particularly advantageous cross-sectional shape for the annular piston is approximately square or rectangular.

In accordance with a further preferred feature of the invention, the capillary means which lead to the bearing pockets or recesses in the bearing flange and in the annular piston jointly open into an annular passage from which the hydraulic pressure is applied to the annular piston, to put the apparatus into the operative condition.

Further objects, features and advantages of the apparatus in accordance with the teachings of this invention will be apparent from the following description of a preferred embodiment, with reference to the accompanying drawings illustrating same in diagrammatic form.

DESCRIPTION OF THE PREFERRED EMBODIMENT

Figure 1:
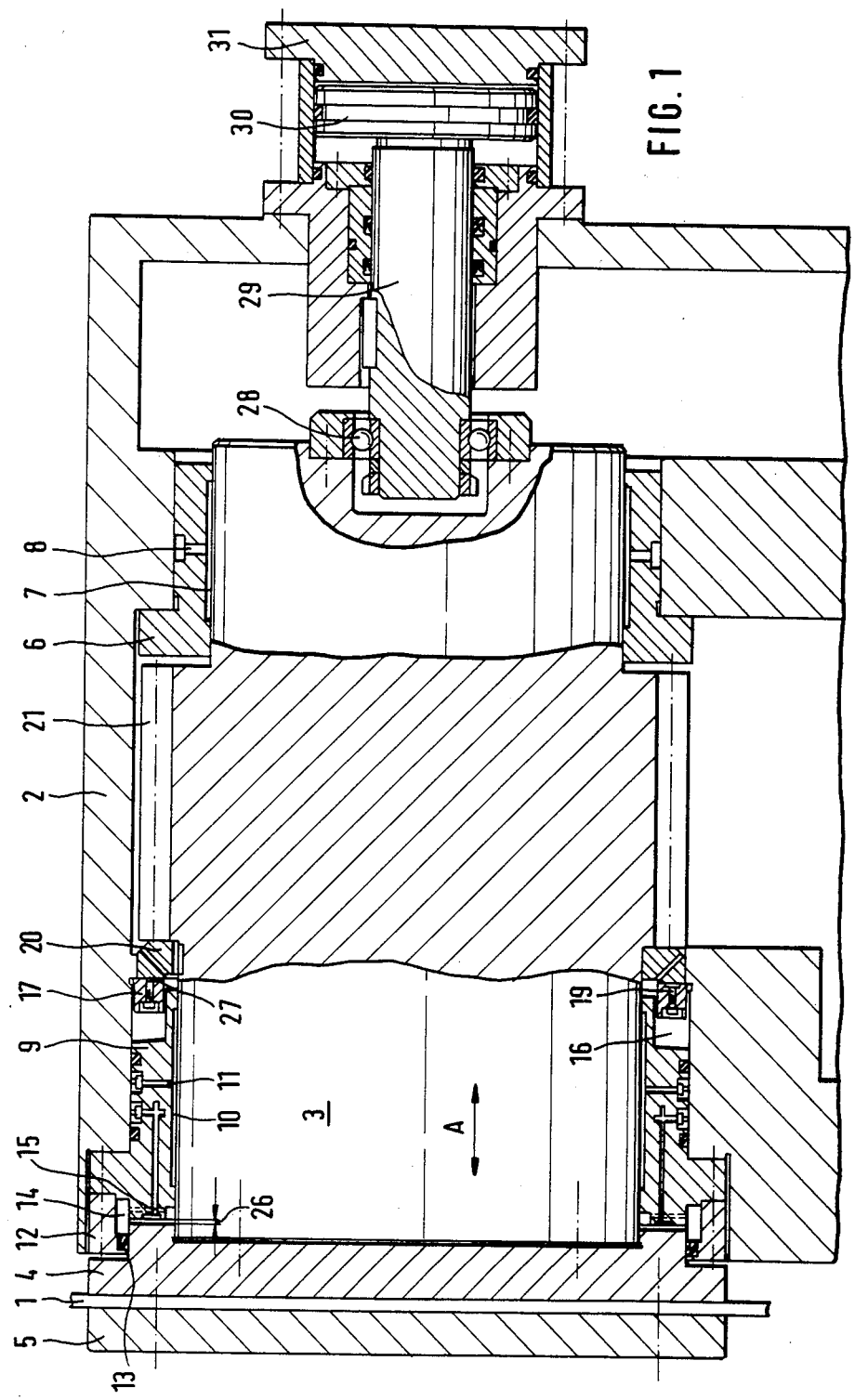
FIG. 1 is a view in axial section through a cutting apparatus in accordance with the invention, shown in the form of a circular saw, in the operative position.
Figure 2:
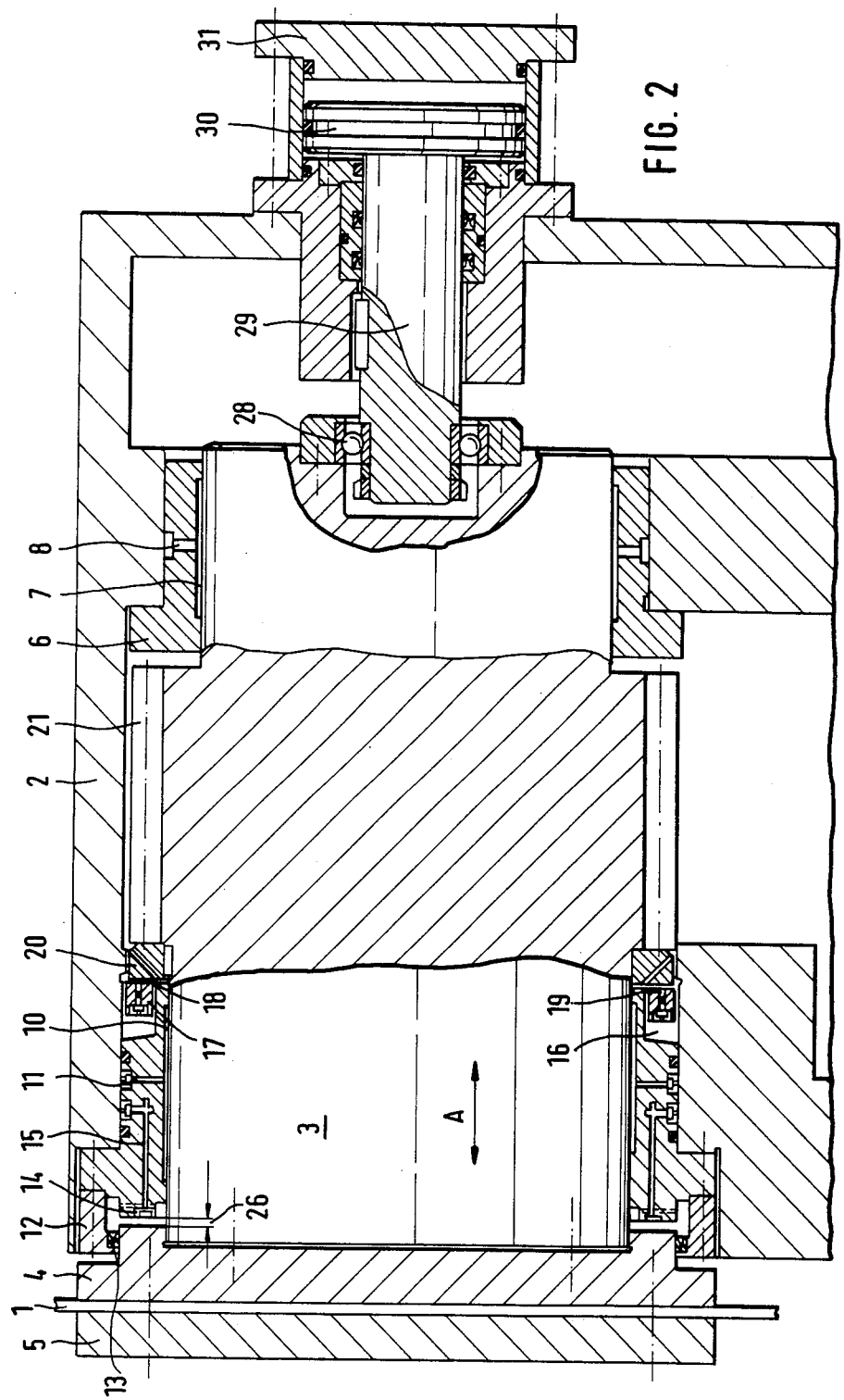
FIG. 2 shows a view corresponding to that shown in FIG. 1 at the beginning of the idle stroke movement of the saw blade, wherein the material to be cut and the shaft of the cutting tool have already performed the axial movements required thereof.

Referring firstly to FIGS. 1 and 2, shown therein is a cutting apparatus in accordance with the present invention, in the form of a circular saw apparatus for cutting metal. Reference numeral 1 denotes a saw blade which is mounted on a shaft 3 which is axially displaceable in the direction indicated by the double-headed arrow A in a bearing or support housing 2. The saw blade or cutting tool 1 is mounted on the shaft 3 between a flange 4 which is screwed to the shaft 3 and a flange 5 which is screwed to the flange 4. The shaft 3 is supported in hydrostatic bearings both in the radial direction and in the axial direction, more particularly in a region of small diameter in a bush or sleeve 6 which is fixedly connected to the housing 2. The bush 6 has bearing pockets or recesses 7 which are supplied with a fluid by way of feed ducts 8 to produce a hydrostatic pressure in the bearing pockets 7. In a larger-diameter portion thereof, the shaft 3 is further supported in a bearing flange 9 which is non-rotatably connected to the bearing housing 2 and which has bearing pockets or recesses as indicated at 10 to which hydrostatic medium which is under a pressure is fed by way of feed ducts 11. At its side or end that is towards the saw blade 1, the bearing flange 9 is screwed to a sealing flange 12 which has a seal means 13 that bears against the flange 4. In addition, at its end which is towards the saw blade 1, the bearing flange 9 has bearing pockets or recesses 14 with capillary feed means 15 leading thereto. At the oppositely disposed end or side, the bearing flange 9 has a region of smaller outside diameter, constituting a terminal portion thereof. Formed therefore between the reduced-diameter portion of the bearing flange 9 and the adjoining inside surface of the bearing housing 2 is an annular gap as indicated at 16, which thus defines an annular cylinder in which an annular piston 17 is displaceable axially, being therefore movable in the direction indicated by the double-headed arrow A. At its side which is remote from the saw blade 1, being therefore towards the right in FIG. 1 for example, the annular piston 17 has bearing pockets or recesses 18 with capillary feed means 19 leading thereto. Disposed in opposite relationship to the bearing pockets 18 is a bearing ring 20 which is non-rotatably connected to the shaft 3. The bearing ring 20 is entrained by the shaft 3 by means of an entrainment connection therebetween, for example in the form of a fitting key, and is axially supported against the face of a pinion 21 which is cut on to the shaft 3. The bearing ring 20 is provided with an oil discharge bore as indicated in greater detail at 22 in FIGS. 3 and 4.

The axial hydrostatic bearing effect for the shaft 3 and thus the saw blade 1 which is mounted thereon is produced by on the one hand the face of the flange 4 which is towards the bearing pockets or recesses 14 in the bearing flange 9 being supported hydrostatically, while on the other hand the annular duct or cylinder 16 is subjected to hydrostatic pressure in such a way that the side of the bearing ring 20 which is towards bearing pockets 18 in the annular piston 17 is also hydrostatically supported.

Figure 3:
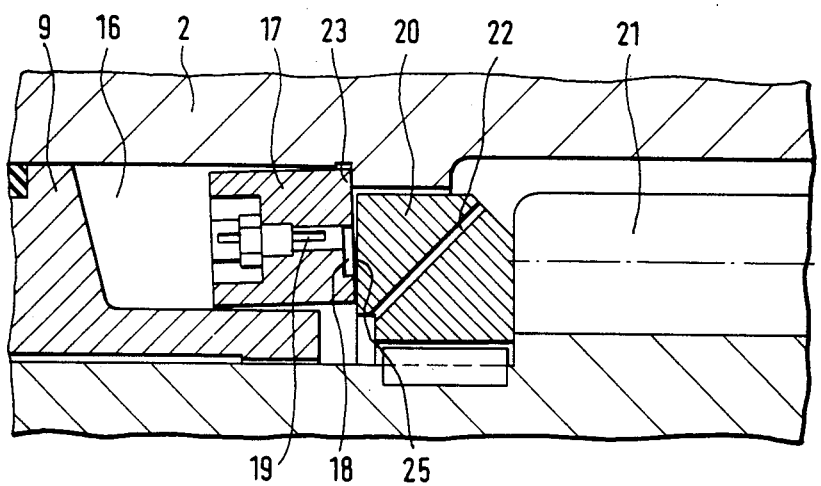
FIG. 3 shows a detail view of the region of the annular piston and the bearing ring, in the operative position.

The annular piston 17 is guided in the annular cylinder 16 with a small clearance therein, and in the operative position of the cutting apparatus, bears by means of its radial end portion as indicated at 23 in FIG. 3, against a shoulder 24 formed on the bearing housing 2 and projecting inwardly into the annular cylinder 16.

Figure 4:
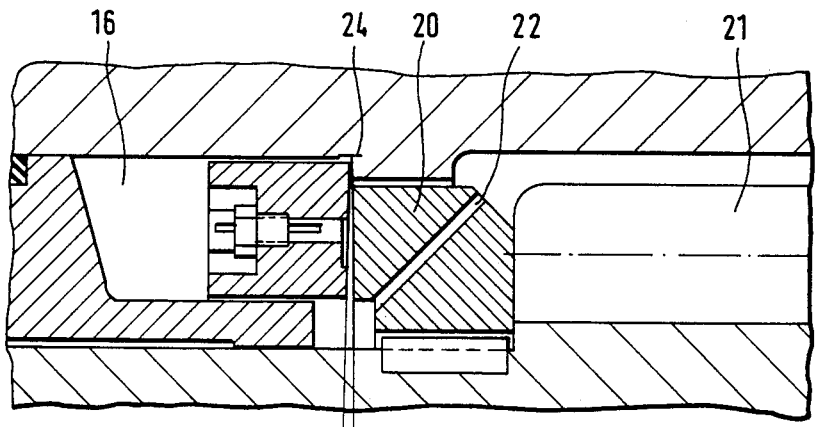
FIG. 4 is a view corresponding to that shown in FIG. 3, reproducing the position shown in FIG. 2.

The face 25 of the bearing ring 20 which is towards the annular piston 17 is of a conical configuration, at an angle as indicated at 26a in FIG. 4, in such a way that the spacing between the side face 25 and the oppositely disposed face of the annular piston 17 increases in size in a radial direction inwardly, as considered from the location of the shoulder 24. The annular piston 17 is of such a cross-sectional shape and elasticity that, when the annular cylinder 16 is subjected to pressure, the annular piston 17 is elastically pivoted or tilted about the shoulder 24 from the rest position shown in FIG. 4 into the operative position shown in FIG. 3, as a result of the effect of the hydraulic pressure applied in the annular cylinder 16, in such a way that on the one hand the mutually facing bearing regions of the annular piston 17 and the bearing ring 20 are at a uniform spacing from each other, as can be clearly seen from FIG. 3, while on the other hand the clearance which is present between the annular piston 17 and the annular cylinder 16 when the arrangement is not in the condition of being subjected to pressure, as illustrated in FIG. 4, is reduced in such a way that the piston comes to bear evenly against the wall surface. The result of that is that the portion of the bearing flange which adjoins the annular cylinder is virtually rigidly supported in the radial direction, due to the action of the annular piston 17. As that is the situation in the operative position of the apparatus, the bearing flange can accordingly be of substantially smaller dimensions than in prior-art apparatuses. In addition, there is no need to provide sealing means for the annular piston, which are absolutely necessary in prior-art apparatuses, as in the operative position the annular gap between the annular piston and the adjoining wall of the annular cylinder is closed and sealed off against a flow of oil therethrough, due to the pivotal movement.

The capillary means which lead to the bearing pockets or recesses in the bearing flange 9 and in the annular piston 17, in another embodiment of the invention, may jointly open into the annular passage 16, from which the hydraulic pressure is applied to the annular piston 17 in order to put the apparatus into the operative position as referred to above.

Thus, in the position of the saw blade 1 shown in FIG. 2, being the operative position, the saw blade-carrying shaft 3 is hydrostatically gripped in the axial direction, at 26 and 27.

With the apparatus in the position shown in FIG. 1, the cutting operation can be carried out. The part of the material to be cut (not shown), which is remote from the shaft 3 carrying the saw blade 1, is then moved away towards the left in the drawing from the saw blade 1 by a distance x. The saw blade 1 is then moved in the same direction by a distance equal to x/2. With the apparatus in that position, the saw blade can now perform its return or idle stroke movement, without making any contact with the material being cut. That is achieved by virtue of the action of a piston rod 29 which engages the shaft 3 by way of a bearing assembly 28. The piston rod 29 is connected to a piston 30 which is non-rotatably movable freely in a cylinder 31. By virtue of applying hydraulic pressure to the circular face of the piston 30, with the annular piston 17 being partially relieved of load, when the apparatus is in the position shown in FIG. 1, the shaft 3 is moved towards the left in FIG. 1 by the above-indicated distance x/2, while the radial hydrostatic bearing effect is still substantially maintained, thereby now forming an enlarged gap as indicated at 26 in FIG. 2.

After the saw blade has concluded its return movement, and is thus in a position ready to begin a fresh cutting operation, the shaft 3 is returned in the axial direction to its operative position, by virtue of a pressure on the circular face of the piston 30, which is towards the right in FIGS. 1 and 2, being reduced, and by the pressure in the annular cylinder 16 acting on the annular piston 17 being increased, until the shaft 3 is once again hydrostatically gripped in the axial direction.

It will be appreciated that the foregoing apparatus was described solely by way of example of the principles of the invention and that various modifications and alterations may be made therein without thereby departing from the spirit and scope of the present invention.

We claim:

1. In a cutting apparatus comprising a bearing housing, a shaft for carrying a cutting tool, the shaft being supported in the bearing housing axially displaceably for the purposes of producing a return movement of the cutting tool after a cutting operation without contacting the material being cut, and a hydrostatic shaft bearing arrangement adapted to support the shaft radially and axially in the bearing housing and including: a bearing flange which is non-rotatably carried by the bearing housing therewithin and which has a radially inward surface and first and second ends facing in the axial direction of the bearing housing and which is provided on its inward surface and at its first end which is towards said cutting tool with a bearing pocket means having a capillary feed means communicating therewith, the bearing flange further having at its second end a portion of smaller outside diameter than the remainder of the bearing flange whereby said portion is spaced inwardly from the adjoining inside surface of the bearing housing thereby to define an annular cylinder; an annular piston axially slidably disposed in said annular cylinder and provided at a face which faces away from said bearing flange with a bearing pocket means having a capillary feed means leading thereto; and disposed on said shaft non-rotatably relative thereto at a position adjoining said annular piston a bearing ring having a face which faces towards said annular piston, the annular piston in the operative position of the cutting apparatus and the bearing ring being supported relative to each other under the effect of a hydraulic pressure in said annular cylinder, the improvement that the annular piston is guided with a small clearance in the annular cylinder and the annular piston in the operative position of the cutting apparatus bears with a radial portion of its face that faces towards said bearing ring against a shoulder projecting inwardly from the said inside surface of the bearing housing, the annular piston being of such a cross-sectional shape and elasticity that in the said operative position the annular piston is elastically tilted about its contact with said shoulder as a result of the applied hydraulic pressure in said annular cylinder, whereby the clearance between said annular piston and said annular cylinder is so reduced that the annular piston is capable of carrying shaft bearing forces in a radial direction, said face of said bearing ring which faces towards said annular piston being of a conical configuration such that in said operative tilted position of said annular piston said mutually facing faces of said piston and said bearing ring are at a uniform spacing.

2. Apparatus as set forth in claim 1 wherein the cross-sectional shape of the annular piston is substantially square.

3. Apparatus as set forth in claim 1 wherein the cross-sectional shape of the annular piston is substantially rectangular.

4. Apparatus as set forth in claim 1 wherein said capillary feed means leading to the bearing pocket means in the bearing flange and in the annular piston communicate jointly with the annular cylinder from which hydraulic pressure is applied to the annular piston to move same into said operative position.

5. Apparatus as set forth in claim 1 in the form of a circular saw apparatus.

6. A circular saw comprising a support housing; a shaft for mounting a saw blade, being axially displaceable in the support housing to provide clearance for the saw blade from the material being cut, during a return movement of the saw blade; a support member in the support housing, having first and second ends and a radially inward surface; hydrostatic bearing pocket means provided in said radially inward surface and in said first end face of said support member to provide respectively radial bearing support and axial bearing support in one axial direction, for said shaft; at said second end of said support member a reduced-diameter portion thereby defining an annular cylinder means between said reduced-diameter portion and the inside surface of said support housing; an annular piston displaceable in said annular cylinder; a bearing ring non-rotatably carried on said shaft and adjacent to said annular piston; hydrostatic bearing pocket means provided in the face of said piston adapted to co-operate with said bearing ring to provide a hydrostatic support action in the other axial direction of the shaft; an abutment means on said inside surface of said support housing and extending substantially radially inwardly thereof, said piston being adapted to be urged by hydraulic pressure in said cylinder means into abutment against said abutment means in the operative position of said apparatus, the piston being adapted in said operative position to be tilted in said cylinder means by abutting against said abutment means, thereby providing a rigid support between said inside surface of said support housing and said reduced-diameter end portion of said support member, thereby to carry bearing forces in a radial direction.

* * * * *